US012498918B2

(12) United States Patent
Hache

(10) Patent No.: US 12,498,918 B2
(45) Date of Patent: Dec. 16, 2025

(54) DEVICE MANAGEMENT SYSTEM WITH EMBEDDED MANAGEMENT OPERATION DATABASE

(71) Applicant: Rambus Inc., San Jose, CA (US)

(72) Inventor: Vincent Hache, Vancouver (CA)

(73) Assignee: RAMBUS INC., San Jose, CA (US)

( * ) Notice: Subject to any disclaimer, the term of this patent is extended or adjusted under 35 U.S.C. 154(b) by 198 days.

(21) Appl. No.: 18/533,897

(22) Filed: Dec. 8, 2023

(65) Prior Publication Data

US 2024/0201978 A1    Jun. 20, 2024

Related U.S. Application Data

(60) Provisional application No. 63/387,548, filed on Dec. 15, 2022.

(51) Int. Cl.
*G06F 8/65* (2018.01)
(52) U.S. Cl.
CPC ...................... *G06F 8/65* (2013.01)
(58) Field of Classification Search
CPC ........................................................ G06F 8/65
USPC ........................................................ 717/168
See application file for complete search history.

(56) References Cited

U.S. PATENT DOCUMENTS 9,792,250 B1   10/2017  Robbins et al.
11,433,290 B2 *  9/2022  Blahnik ......... G06Q 10/063114

2013/0268827 A1 * 10/2013 Mercer ................ G06F 16/954
715/205
2016/0196131 A1 *  7/2016 Searle ................... H04L 41/082
717/173
2018/0329762 A1   11/2018 Li et al.

OTHER PUBLICATIONS

Kimball, Ralph, and B. Verplank E. Harslem. "Designing the Star user interface." Byte 7.1982 (1982): pp. 242-282. (Year: 1982).*
Rekimoto, Jun, and Katashi Nagao. "The world through the computer: Computer augmented interaction with real world environments." Proceedings of the 8th annual ACM symposium on User interface and software technology. 1995.pp. 29-36. (Year: 1995).*
Ivory, Melody Y., and Marti A. Hearst. "The state of the art in automating usability evaluation of user interfaces." ACM Computing Surveys (CSUR) 33.4 (2001): pp. 470-516. (Year: 2001).*

* cited by examiner

*Primary Examiner* — Satish Rampuria
(74) *Attorney, Agent, or Firm* — Amsel IP Law PLLC; Jason Amsel

(57) ABSTRACT

An IC device stores an event descriptor database that includes an event descriptor set describing a set of events relating to management of the IC device. The IC device sends the event descriptor set to a utility application that generates a user interface based on the event descriptor set. In response to interactions with the user interface, the utility application sends controls and/or receives data from the IC device relating to the events. The event descriptor set may be updated to cause the utility application to generate an updated user interface for the IC device without requiring any update to the utility application logic.

20 Claims, 6 Drawing Sheets

```
{
  "name": "Device Info",                "data": [
  "actions": [                            {
    {                                       "name": "Device ID",
      "name": "Read Info",                  "type": "string",
      "id": "UNIQUE_ID1"                    "value": "-",
    },                                      "id": "UNIQUE_ID4",
    {                                     },
      "name": "Reset Device",             {
      "id": "UNIQUE_ID2"                    "name": "Device Version",
    }                                       "type": "string",
  ],                                        "value": "-",
  "options": [                              "id": "UNIQUE_ID5",
    {                                     },
      "name": "Reset Type",               {
      "type": "list",                       "name": "FW Version",
      "id": "UNIQUE_ID3"                    "type": "string",
      "value": [                            "value": "-",
        "Soft Reset",                       "id": "UNIQUE_ID6",
        "Hard Reset",                     },
      ]                                   {
    }                                       "name": "Device State",
  ],                                        "type": "string",
                                            "value": "-",
                                            "id": "UNIQUE_ID7",
                                          }
                                        ]
                                      }
```

FIG. 4

DEVICE MANAGEMENT SYSTEM WITH EMBEDDED MANAGEMENT OPERATION DATABASE

CROSS-REFERENCE TO RELATED APPLICATION

This application claims the benefit of U.S. Provisional Patent Application No. 63/387,548 filed on Dec. 15, 2022, which is incorporated by reference herein.

BACKGROUND

Modern ASICs (Application Specific Integrated Circuits) and SoCs (Systems On Chip) may be managed using external utilities for configuring, debugging, and managing these devices. Conventionally, firmware updates to such devices require corresponding updates to the utilities to maintain compatibility. Failure to maintain compatibility can result in loss of performance or function of these devices.

BRIEF DESCRIPTION OF THE DRAWINGS

The teachings of the embodiments herein can be readily understood by considering the following detailed description in conjunction with the accompanying drawings.

FIG. 4 is an example event descriptor set for device management.

DETAILED DESCRIPTION

An IC device stores an event descriptor database that includes an event descriptor set describing a set of events relating to management of the IC device. The IC device sends the event descriptor set to a utility application that generates a user interface based on the event descriptor set. In response to interactions with the user interface, the utility application sends control signals and/or receives data from the IC device relating to the events. The event descriptor set may be updated (responsive to actions or detected conditions) to cause the utility application to generate an updated user interface for the IC device without requiring any update to the utility application logic.

Figure 1:
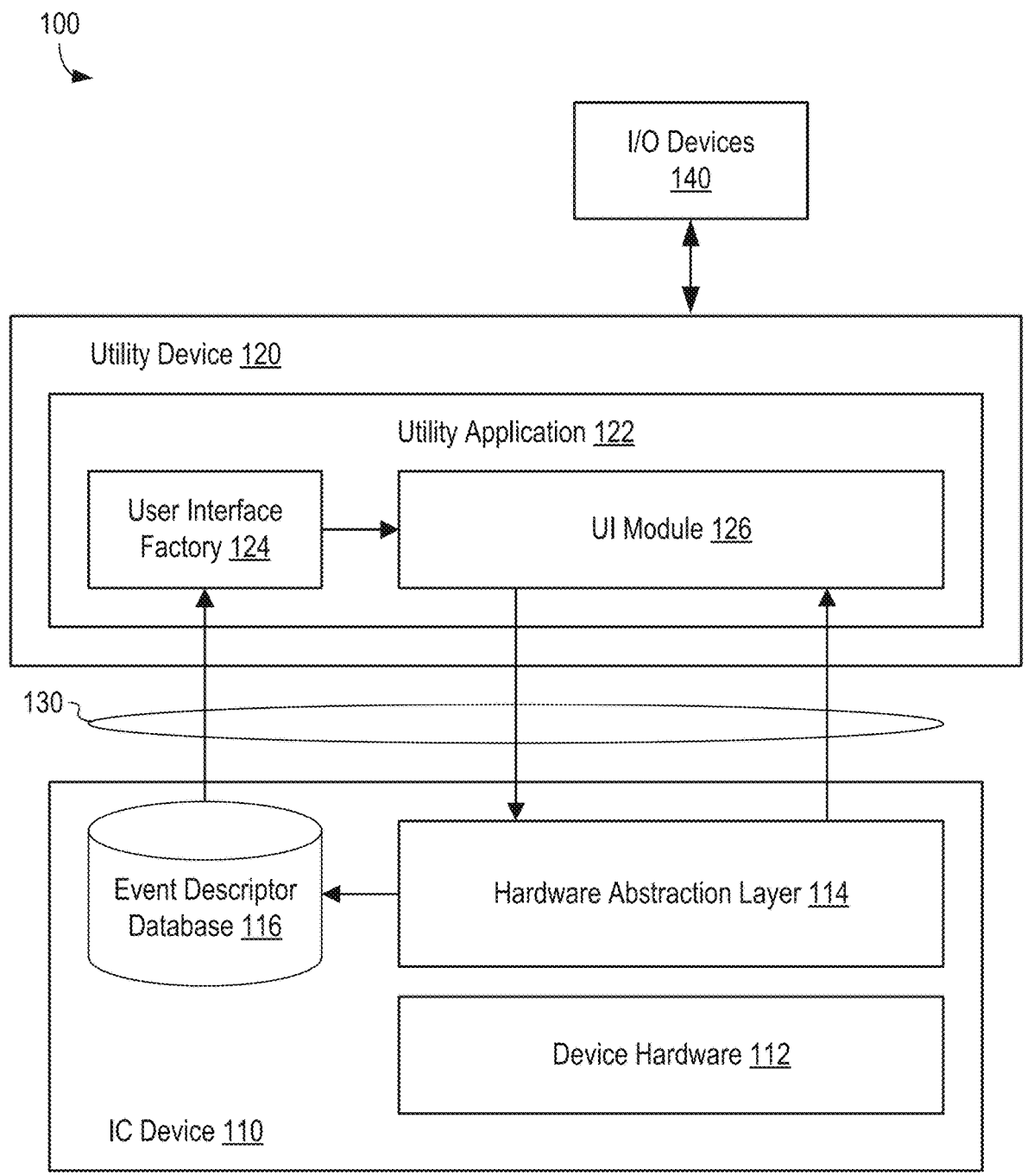
FIG. 1 is an example embodiment of a device management system.

FIG. 1 is an example embodiment of a device management architecture associated with an IC device 110 such as an ASIC, SoC, or other device. The IC device 110 includes device hardware 112, a hardware abstraction layer 114, and an event descriptor database 116. The device hardware 112 may include digital logic, one or more processors, memory, registers or other storage, input/output ports, or other hardware components of an IC device 110. The device hardware 112 may include hardware for performing general functions of the IC device 110 in its intended operation and may include hardware associated with device management such as diagnostics, debugging, version management, configuration, etc.

The hardware abstraction layer 114 may comprise firmware that abstracts low-level hardware functions of the device hardware 112 into higher-level capabilities, functions, operations, status outputs, etc. The hardware abstraction layer 114 may receive commands via an external interface 130 to the utility device 120, translate the commands to operations executable by the device hardware 112, and provide the commands to the device hardware 112 for execution. The hardware abstraction layer 114 may furthermore receive data from the device hardware 112 in a form native to the device hardware 112 and may optionally translate the data into a different form for outputting to the utility device 120.

The IC device 110 furthermore includes an event descriptor database 116 that stores descriptors for a set of events. The descriptors may comprise hierarchical, object-based definitions of the events that include descriptions, properties, or other metadata. Each event specifies a type of interaction between the IC device 110 and the utility device 120 associated with management functions of the IC device 110. Event types may include action events that facilitate an operation of the IC device 110 performed by the device hardware 112, option events that facilitate setting configuration values of registers of the IC device 110, or data events that facilitate outputting data elements from the IC device 110 to the utility device 120. The functions of the different types of events in the event descriptor database 116 may be related. For example, an action event may cause execution of a function that is dependent on a stored parameter configurable by an option event and/or an action event may output data elements specified in a data event. The various events in the event set collectively enable various diagnostic, debugging, configuration, or other management functions of the IC device 110, examples of which are described in further detail herein. Furthermore, events may cause updates to the event descriptor database 116 that may enable different types of events depending on the state of the IC device 110.

The event descriptor database 116 may store the event descriptors in accordance with a predefined schema that controls the different types of available event descriptors, their respective fields, and their syntax. An example schema for a set of event descriptor is provided in FIG. 2 and discussed in further detail below.

The utility device 120 executes a utility application 122 that facilitates the various management functions associated with the IC device 110 described by the event descriptor database 116. The utility application 122 includes a user interface (UI) factory 124 and a UI module 126. The UI factory 124 receives the event descriptors from the event descriptor database 116 of the IC device 110 and generates, based on the event descriptors, a UI module 126 that renders a user interface and processes interactions with the user interface. The UI factory 124 may generate a different UI element for each event descriptor in the event descriptor database 116. These elements may be generated differently depending on their respective event types and depending on the specific logic of the UI factory 124. For example, for each action event descriptor, the UI factory 124 may generate an action button or other selectable UI control element associated with a predefined action that can be performed by the device hardware 112. For each option event descriptor, the UI factory 124 may generate an option UI element for setting or updating a selectable option that can be stored to a register of the IC device 110 and that may relate to actions or otherwise affect configuration of the IC device 110. For each data event, the UI factory 124 may generate a data element for presenting data elements obtained from the IC device 110.

The UI factory 124 may include logic that controls the mapping of different types of event descriptors to different types of user interface elements. For example, in one embodiment, the UI factory 124 may map event descriptors to user interface elements in a graphical user interface suitable for facilitating user interactions via a pointer device or touch screen. Here, action events may map to clickable buttons or toggles, option events may map to a dropdown list, a list box, a text entry box, a set of radio buttons, a set of checkboxes, etc., and data events may map to text fields, images, etc. An example embodiment of a graphical user interface is provided in FIG. 5 and described in further detail below. In another embodiment, the UI factory 124 may map events to a text-based user interface (e.g., a command line user interface) suitable for presenting in a command line display or other text-based interface. Here action events and option events may map to respective keyboard inputs for initiating a corresponding action or configuring an available option. Data events may similarly map to text fields that are displayed in text-based user interface. An example embodiment of a text-based user interface is provided in FIG. 6 and described in further detail below.

In an embodiment, the UI factory 124 may group together a set of event descriptors in an event set to provide separation between user interface elements associated with different event sets. For example, user interface elements in the same event set may be grouped together in a same tab, window, and/or area of the user interface, while user interface elements derived from different events sets may be presented in different tabs, windows, or areas of the user interface.

The logic of the UI factory 124 may be configured for compatibility with the event descriptor schema used by the event descriptor database 116 but may be otherwise agnostic to the contents of the event descriptor database 116. Thus, updates to the content of the event descriptor database 116 may be interpreted by the UI factory 124 to update the UI module 126 without requiring any changes to the logic of the user interface factory 124 itself. Similarly, different versions of a user interface factory 124 may generate different styles of UI modules 126 from the same event descriptor database 116.

The UI factory 124 may dynamically update the UI module 126 responsive to updates received from the event descriptor database 116 that may be triggered based on interactions with the UI module 126 or based on detected conditions. For example, responsive to trigger an action or setting an option in the user interface, the IC device 110 may perform a function that updates the event descriptor database 116 with modified event descriptors relating to the action or option. This in turn causes the UI factory 124 to update the UI module 126 based on the modified event descriptors. In other situations, a detected condition of the IC device 110 may cause the IC device 110 to update the event descriptor database 116, which causes the UI module 126 to update.

The UI module 126 manages the user interface generated by the user interface factory 124. The UI module 126 may generate a presentation of the user interface outputted to an I/O device 140 (e.g., a display) and may receive user inputs via the I/O device 140 (e.g., a pointer, touchscreen, keyboard, or other input device) associated with the various user interface elements. The UI module 126 may furthermore send commands to the IC device 110 via the external interface 130 in response to user interface inputs. For example, the commands may include commands to initiate a predefined action (responsive to selection of an action control element) or set an option (e.g., responsive to selection of an option from an option list). The UI module 126 may furthermore receive data elements from the IC device 110, which may be displayed in the user interface.

The external interface 130 may comprise any wired or wireless communication interface for communicating between the IC device 110 and the utility device 120. For example, the external interface 130 may operate according to protocols such as I2C, SMBus, I3C, Ethernet, UART, PCIe, CXL.io, or any other communication protocol.

In the above-described configuration, the utility application 122 need not have any a priori knowledge of the device type, capabilities, or generational differences of the IC device 110 because the various management capabilities of the utility application come from the IC device 110 itself. The IC device 110 may therefore be designed to support a range of management functions that may change with firmware updates to the IC device 110. The utility application 122 may support a range of different devices and device versions without changes to the logic of the utility application 122 and without utilizing any external information about the IC device 110.

Figure 2:
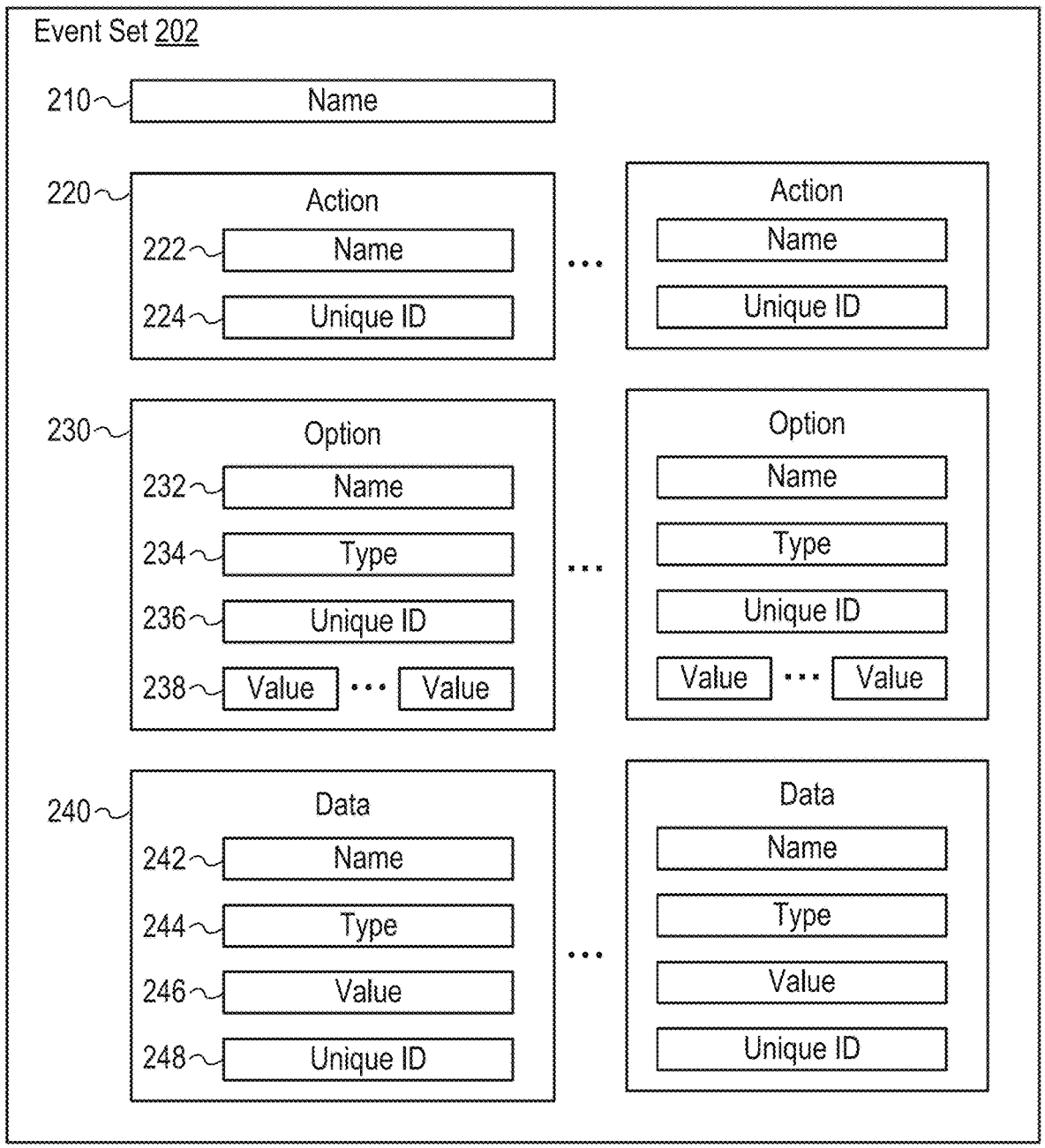
FIG. 2 is an example event descriptor schema for communicating event descriptors associated with device management.

FIG. 2 is a diagram representing an example event descriptor schema. Events are organized into event sets 202 that include a name field 210, and one or more events such as one or more action events 220, one or more option events 230, and/or one or more data events 240. An event set 202 does not necessarily include every event type (actions, options, data) and may include only one event type or some subset of event types. For example, an event set 202 may include only an action event 220 without necessarily including option events 230 and/or data events 240.

Each action event 220 includes a name field 222 and a unique identifier field 224. The name field 222 specifies a user facing text string that is displayed by the user interface in association with an action control generated for the action event. The unique identifier 224 comprises a globally unique value (unique across all event types) identifying the action event 220. In response to selecting the action control in the user interface, the user interface module 126 communicates the unique identifier 224 to the IC device 110. The unique identifier 224 may be invisible to the end user.

Each option event 230 includes a name field 232, a type field 234, a unique identifier field 236, and one or more values 238. The name field 232 specifies a user facing text string that is displayed by the user interface in association with an option control generated for the option event. The type field 234 specifies a type of option that may affect how the option is presented in the user interface. For example, the type field 234 may be set to one of a set of predefined values (e.g., a list, a toggle, a set of checkboxes, etc.). For some types of options, the option value may be selectable from a predefined list of options. Alternatively, an option value may be set or updated using a text entry field (e.g., configurable between a null value and some specified value). The values 238 represent a range of selectable values for the option event 230 whose interpretation depend on the type field. The unique identifier 236 comprises a globally unique value (unique across all event types) identifying the option event 230. In response to interacting with an option control in the user interface, the user interface module 126 communicates the unique identifier 236 for the option 230 and the selected value to the IC device 110.

Each data event 240 includes a name field 242, a type field 244, a value field 246, and a unique identifier field 248. The name field 242 specifies a user facing text string that is displayed by the user interface in association with the data event 240. The type field 244 specifies a data type from a set of selectable data types such as string, integer, date, etc. The value 246 specifies an initial value for the data element 240. The unique identifier 248 comprises a globally unique value (unique across all event types) identifying the data event 240. The user interface may update the values 246 for the data fields in the user interface in response to receiving the unique identifier 248 identifying the data element 240 and an updated value from the IC device 110.

Figure 3:
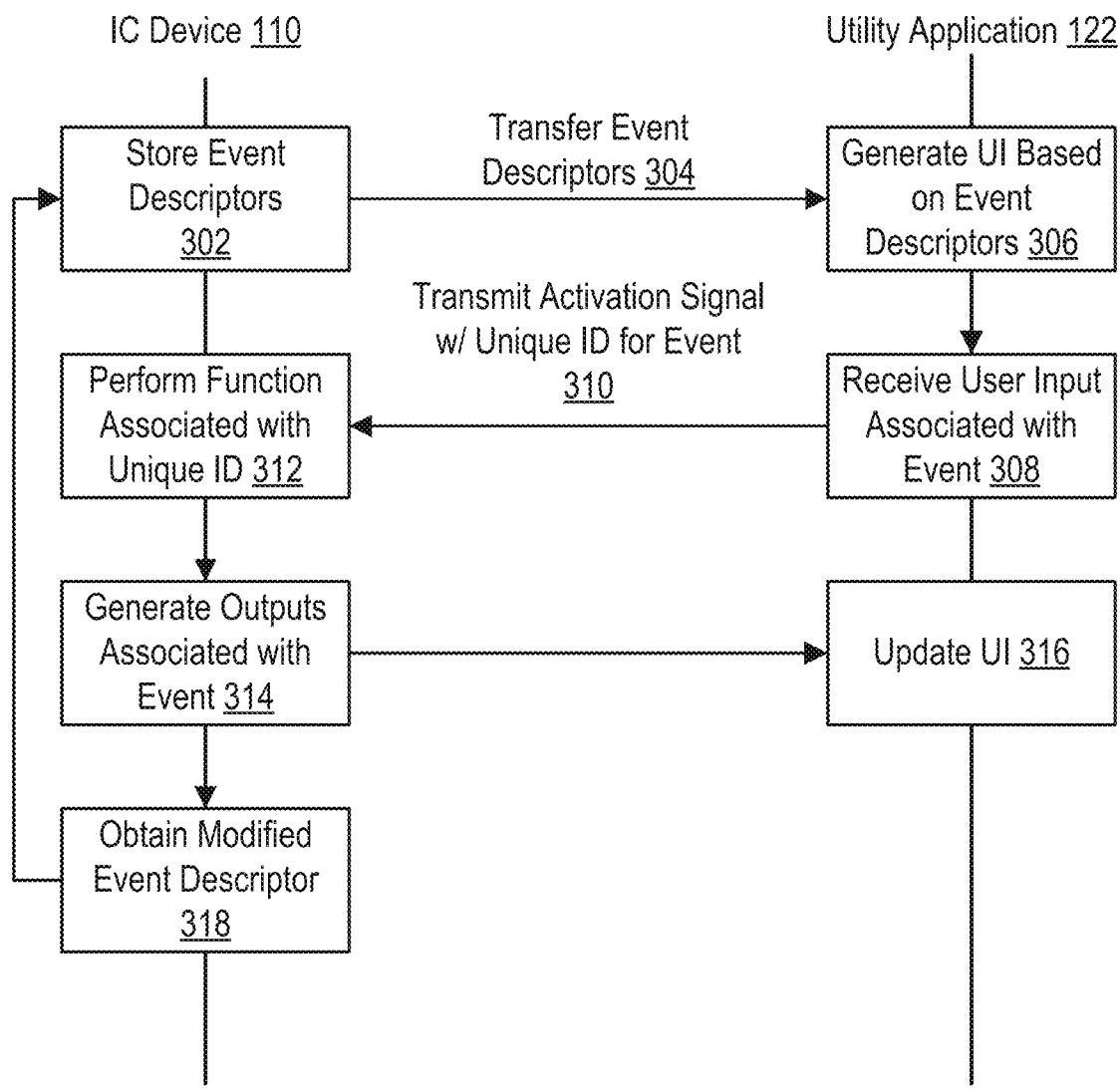
FIG. 3 is a flowchart illustrating an example embodiment of a process for managing a device in conjunction with a utility application.

FIG. 3 is an example embodiment of a process for operating an IC device 110 in conjunction with a utility application 122. The IC device 110 stores 302 a set of event descriptors in the event descriptor database 116. As described above, the event descriptors each describe an event implementable by the utility application 122 and includes sufficient information for the utility application 122 to generate a user interface enabling initiating of actions on the IC device 110, setting options associated with operation of the IC device 110, and/or displaying data elements obtained from the IC device 110.

The IC device 110 transfers 304 the event descriptors to the utility application 122 via the external interface 130. The UI factory 124 of the utility application 122 generates 306 a user interface based on the event descriptors, which may include one or more controls for activating an action event, one or more controls for configuring an option event, and one or more data elements for displaying data events. The utility application receives 308 a user input associated with one of the events. For example, the utility application 122 may receive an interaction with an action control associated with an action event or an option selection associated with an option event. The utility application 122 transmits 310 an activation signal including a unique identifier associated with the control for the selected event. In the case of an option modification, the activation signal may furthermore include an updated value for the option.

The IC device 110 performs 312 a predefined function associated with the unique identifier for the selected control. Functions associated with actions may include, for example, writing to memory, reading from memory, reading or writing from an external port, performing a reset, executing a predefined set of instructions, or performing a different function. Functions associated with options may include writing the updated option value to a predefined register. In an embodiment, actions may be affected by configured options. For example, an option control may set a predefined register of the IC device 110 to configure a reset type as either a hard reset or a soft reset. A reset action, when activated, may be performed as either a soft reset or a hard reset depending on this stored value.

The function implemented by the IC device 110 in response to an action event or an option event may optionally generate 314 outputs associated with the event. For example, the outputs may include values for data elements that may be transmitted to the utility application 122 by providing the unique identifiers and values for the respective data elements. The utility application 122 updates 316 the user interface based on the outputs.

The IC device 110 may subsequently obtain 318 modified event descriptors. The modified event descriptors may be obtained in response to the function performed by the IC device (step 312). For example, an action or option initiated via the utility application 122 may change a configuration of the IC device 110, which may in turn cause a new set of event descriptors to be loaded into the event descriptor database 116 and transferred to the utility application 122. This may in turn cause the UI factory 124 to regenerate or update the user interface and the available events. In another embodiment, the IC device 110 may obtain 318 modified event descriptors that are loaded based on a sensed condition of the IC device 110. For example, the IC device 110 may be programmed to load different event descriptors in response to detecting a value in a predefined register, receiving a value on an external interface, or detecting another predefined triggering condition. The process of FIG. 3 may then be performed with respect to the modified event descriptors.

In other examples, data elements may be output from the IC device 110 to the utility application 122 based on other triggers that are not necessarily initialized by an action event or option even from the utility application 122. For example, the IC device 110 may output updated values for data elements when the IC device 110 internally measures a new data value in response to an internal timer, interrupt, or other trigger.

FIG. 4 illustrates an example set of event descriptors of an event set associated with managing an IC device 110. This example uses a JavaScript Object Notation (JSON) format. In other embodiments, a different format may be used. The example of FIG. 4 shows an event set with name "Device Info" that comprises two actions ("Read Info" and "Reset Device"), one option ("Reset Type" selectable as either "Soft Reset" or "Hard Reset"), and four data elements ("Device ID," "Device Version," "FW Version," and "Device State").

Figures 5, 6:
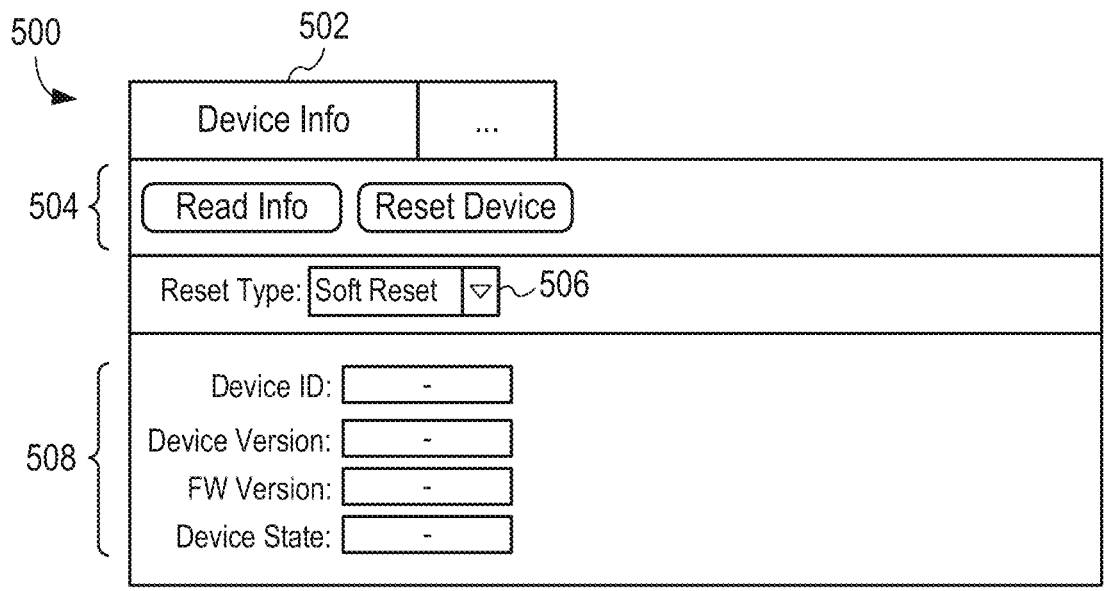
FIG. 5 is an embodiment of a graphical user interface of a utility application for managing a device based on an event descriptor set.
FIG. 6 is an embodiment of a command line interface of a utility application for managing a device based on an event descriptor set.

FIG. 5 illustrates a first example of a user interface 500 that may be generated based on the example set of event descriptors in FIG. 4. For this user interface 500, the UI factory 124 organizes each event set as a tab 502 of the user interface 500 that displays the name of the event set (e.g., a tab for "Device Info"). The UI factory 124 generates clickable buttons 504 for each action event (e.g., a "Read Info" button and a "Reset Device" button). The UI factory 124 furthermore generates the option event with type "list" as a dropdown box 506 (e.g., a dropdown box for "Reset Type" selectable between "Soft Reset" and "Hard Reset"). The UI factory 124 generates data elements 508 for each data event that specifies the name of the data event (e.g., "Device ID", "Device Version," "FW Version," and "Device State") and their respective values (each initially set to "-").

FIG. 6 illustrates a second example of a user interface 600 that may be generated based on the example set of event descriptors in FIG. 4. In this example, the user interface 600 comprises a command line interface that displays the event set name 602, the names for each action 604 and option 606 together with a keyboard input for selecting that action for option, and the set of data elements 608.

Figure 7:
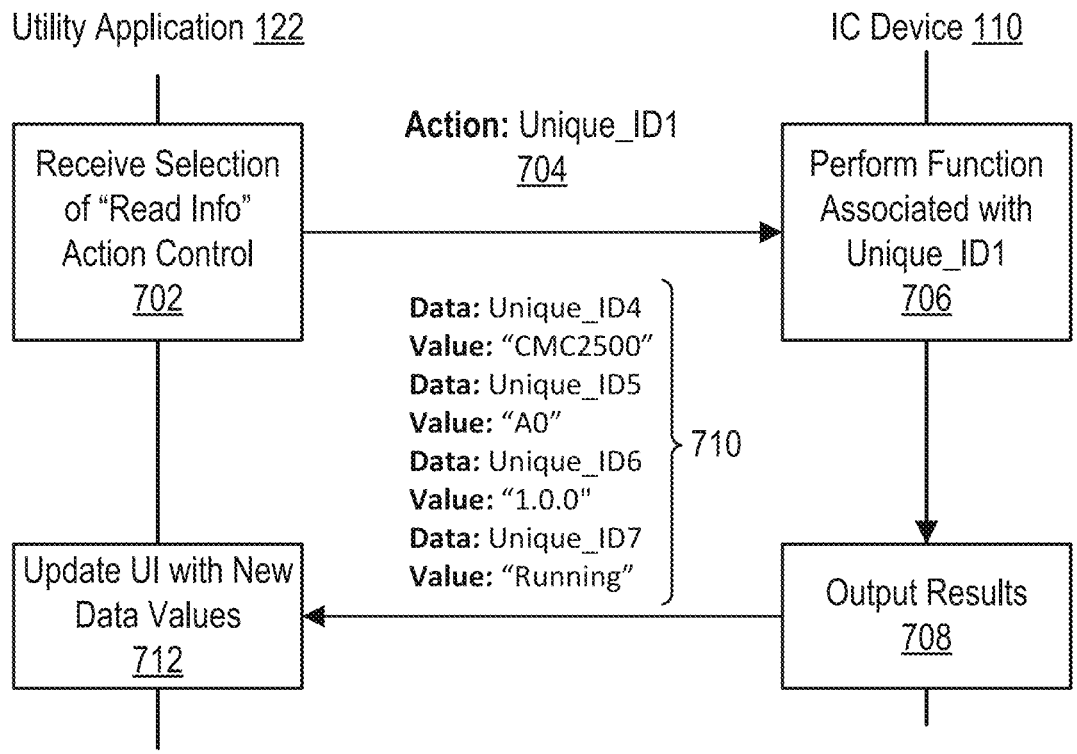
FIG. 7 is a flowchart illustrating an example embodiment of a process for processing a command from a utility application associated with an example event descriptor set.
Figure 8:
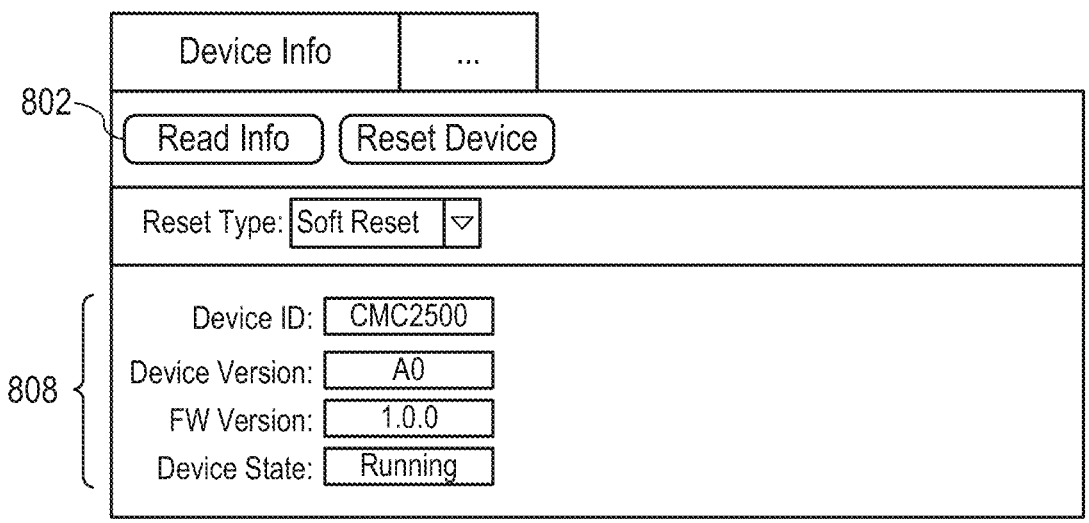
FIG. 8 is an embodiment of a graphical user interface of a utility application that is updated in response to a user input in accordance with an example event descriptor set.

FIG. 7 illustrates a process associated with the example event descriptor set of FIG. 4. This example shows operations of the utility application 122 and IC device 110 when the utility application receives 702 a user selection of the "Read Info" action control via the user interface. Responsive to this input, the utility application 122 sends 704 the unique identifier associated with the selected action (Unique_ID1) to the IC device 110 to indicate the selection. The IC device 110 performs 706 the function associated with the received unique identifier (Unique_ID1). In this example, the IC device 110 is programmed to output 708 results that include values for the set of data elements. The output 710 transmitted from the IC device 110 to the utility application 122 may include the respective unique identifiers for each data element and its respective value. The utility application 122 then updates 712 the user interface with the received data values. FIG. 8 illustrates an example user interface 800 following the "Read Info" action 802 that shows the data elements 808 with their respective updated values.

The invention claimed is:

1. A method for controlling interactions between an integrated circuit (IC) device and a utility application executing on a utility device external to the IC device, the method comprising:
storing in a memory of the IC device, an event descriptor set including an event descriptor for an event, the event descriptor including information sufficient for the utility application to trigger the event on the IC device in response to control input to the utility application;
transmitting, via an external interface of the IC device, the event descriptor to the utility application to cause the utility application to generate a user interface including a control for activating the event;
receiving, via the external interface of the IC device, a first activation signal indicating a selection of the control for activating the event;
initiating the event via event initiation logic responsive to the first activation signal, wherein initiating the event includes translating the first activation signal into one or more operations executable by device hardware of the IC device and causing the device hardware to execute the one or more operations;
modifying, via event modification logic of the IC device, the event descriptor set into a modified event descriptor set including a modified event descriptor for a modified event;
transmitting, via the external interface of the IC device, the modified event descriptor to the utility application to cause the utility application to update the user interface to include a modified control for activating the modified event;
receiving, via the external interface of the IC device, a second activation signal indicating selection of the modified control for activating the modified event; and
initiating the modified event via the event initiation logic responsive to the second activation signal.

2. The method of claim 1, wherein the event descriptor set specifies controls and data elements associated with management of the IC device via the utility application.

3. The method of claim 1, wherein the event descriptor includes one or more of:
a selectable action performable by the IC device;
a modifiable option; and
a data element for outputting to the user interface.

4. The method of claim 1, wherein the event descriptor for the event includes an action descriptor that causes the utility application to generate the control as an action control for an action event in the user interface, wherein receiving the first activation signal is indicative of a user selection of the action control, and wherein initiating the event comprises:
initiating a predefined action of the IC device associated with the action event.

5. The method of claim 4, wherein initiating the predefined action comprises:
obtaining at least one configured option associated with the predefined action from a register of the IC device; and
initiating the predefined action in accordance with the at least one configured option.

6. The method of claim 4, wherein initiating the predefined action comprises:
reading one or more data values from the IC device responsive to the predefined action; and
outputting the one or more data values to the utility application for display as data elements of the user interface.

7. The method of claim 1, wherein the event descriptor for the event further includes an option descriptor that causes the utility application to generate an option control for an option event in the user interface that includes a control to configure an option value of the option, wherein receiving the first activation signal is indicative of a user modification of the option value, and wherein initiating the event comprises:
storing the option value to a register of the IC device associated with the option event.

8. The method of claim 1, wherein the event descriptor includes:
a user-facing display name for the event displayed by the user interface in association with the control for activating the event; and
a unique identifier associated with the event.

9. The method of claim 8, wherein receiving the first activation signal comprises receiving the unique identifier associated with the event, and wherein initiating the event comprises performing a predefined action of the IC device associated with the unique identifier.

10. The method of claim 1, wherein initiating the event comprises:
obtaining, by the IC device, an updated data value for a data element associated with a unique identifier in the event descriptor; and
transmitting, via the external interface of the IC device, the updated data value and the unique identifier to the utility application to cause the utility application to update the data element with the updated data value.

11. An integrated circuit (IC) device comprising:
a memory to store an event descriptor set including an event descriptor for an event, the event descriptor including information sufficient for a utility application executing on a utility device external to the IC device to trigger the event on the IC device in response to a control input to the utility application;
an external interface to transmit the event descriptor to the utility application to cause the utility application to generate a user interface including a control for activating the event, and to receive, via the external interface of the IC device, a first activation signal indicating a selection of the control for activating the event;
event initiation logic to initiate the event responsive to the first activation signal, wherein initiating the event includes translating the first activation signal into one or more executable operations;
device hardware to execute the one or more executable operations; and
event modification logic to modify the event descriptor set into a modified event descriptor set including a modified event descriptor for a modified event;

wherein the external interface transmits the modified event descriptor to the utility application to cause the utility application to update the user interface to include a modified control for activating the modified event;

wherein the external interface receives a second activation signal indicating selection of the modified control for activating the modified event; and wherein the even initiation logic initiates the modified event via the event initiation logic responsive to the second activation signal.

12. The IC device of claim 11, wherein the event descriptor set specifies controls and data elements associated with management of the IC device via the utility application.

13. The IC device of claim 11, wherein the event descriptor includes one or more of:
 a selectable action performable by the IC device;
 a modifiable option; and
 a data element for outputting to the user interface.

14. The IC device of claim 11, wherein the event descriptor for the event includes an action descriptor that causes the utility application to generate the control as an action control for an action event in the user interface, wherein receiving the first activation signal is indicative of a user selection of the action control, and wherein the event initiation logic initiates a predefined action of the IC device associated with the action event.

15. The IC device of claim 14, wherein the event initiation logic obtains at least one configured option associated with the predefined action from a register of the IC device, and initiates the predefined action in accordance with the at least one configured option.

16. The IC device of claim 14, wherein the event initiation logic reads one or more data values from a register of the IC device responsive to the predefined action and output the one or more data values to the utility application for display as data elements of the user interface.

17. The IC device of claim 11, wherein the event descriptor for the event further includes an option descriptor that causes the utility application to generate an option control for an option event in the user interface to configure an option value of the option, wherein receiving the first activation signal is indicative of a user modification of the option value, and wherein the event initiation logic stores the option value to a register of the IC device associated with the option event.

18. The IC device of claim 11, wherein the event descriptor includes:
 a user-facing display name for the event displayed by the user interface in association with the control for activating the event; and
 a unique identifier associated with the event.

19. The IC device of claim 18, wherein receiving the first activation signal comprises receiving the unique identifier associated with the event, and wherein the event initiation logic performs a predefined action of the IC device associated with the unique identifier.

20. A non-transitory computer-readable storage medium storing instructions executable by a processor of a utility device for implementing a utility application associated with an integrated circuit (IC) device, wherein the utility device is external to the IC device, the instructions when executed causing the processor to perform steps including:
 receiving from the IC device, a descriptor set including an event descriptor for an event, the event descriptor including information sufficient for the utility application to trigger the event on the IC device in response to a control input to the utility application;
 generating a user interface based on the event descriptor set, the user interface including a control for activating the event;
 receiving, via the user interface, a selection of the control from an input device coupled to the utility device;
 responsive to the selection of the control, sending a first activation signal to the IC device to cause the IC device to initiate the event on the IC device, wherein initiating the event includes the IC device translating the first activation signal into one or more operations executable by device hardware of the IC device and causing the device hardware to execute the one or more operations;
 receiving from the IC device, a modified event descriptor set including a modified event descriptor for a modified event;
 updating the user interface based on the modified event descriptor set to include a modified control for activating the modified event;
 receiving, via the user interface, a selection of the modified control; and
 responsive to the selection of the modified control, sending a second activation signal to the IC device to cause the IC device to initiate the modified event on the IC device.

* * * * *